Patented Sept. 21, 1948

2,449,956

UNITED STATES PATENT OFFICE 2,449,956

DIALKYLCYCLOHEXYL GLYCOLS AND CERTAIN DERIVATIVES THEREOF

Edward C. Shokal, Oakland, and Rupert C. Morris, Berkeley, Calif., assignors to Shell Development Company, San Francisco, Calif., a corporation of Delaware No Drawing. Application July 9, 1945, Serial No. 604,104

6 Claims. (Cl. 260—488)

This invention relates to glycols and to a method for their preparation. More particularly, the invention relates to a subclass of novel glycols which comprises the 1-cyclohexyl-1,3-butanediols, and to a method for their preparation which comprises reacting a conjugated diene with an alpha, beta-unsaturated carbonylic compound, thereby forming an unsaturated cyclic carbonylic compound, condensing the said unsaturated cyclic carbonylic compound with a ketone, thereby forming a mixture comprising an alkyl-substituted (cyclohexenyl) alkan-1-ol-3-one and the corresponding 1-(cyclohexenyl)-1-alken-3-one and reacting the said mixture with hydrogen in the presence of a hydrogenation catalyst to form an alkyl-substituted cyclohexyl-1,3-butanediol. The invention also provides certain novel derivatives of the said glycols, particularly the ethers and esters of the said glycols.

The novel glycols (butanediols) of the invention have many important uses. They are useful, for example, as insect repellents, especially when incorporated in a hydrocarbon solvent. They are useful constituents of printing ink compositions, their function being to prevent the ink from drying too rapidly. As textile assistants they make the textile fibers more flexible, increase their stretching properties, and soften the textile materials. The glycols are also useful raw materials for the preparation of glyptal resins, particularly in the preparation of oil-soluble glyptal resins by the reaction between the herein described glycols and a suitable dibasic acid or dibasic acid anhydride. A further application of the herein disclosed novel glycols is in the paint and varnish industry, where they are useful as constituents of various lacquer and synthetic resin varnish compositions. Because of their relatively high boiling points and non-corrosive characteristics, many of the glycols may be used to advantage as hydraulic fluids, particularly in systems where they come in contact with rubber or rubber-like materials. The butanediols of the invention are also valuable solvents for nitrocellulose and related materials. They may be used as anti-foaming agents in chemical processing, as for example, in processing photographic materials, varnishes, paper coatings and rubber latex, as well as in textile printing processes and in the processes of the ceramic industry. The glycols of the invention are particularly valuable as synthetic intermediates in the manufacture of a variety of useful substances such as plasticizers, perfume esters, cosmetic bases, pharmaceuticals, dyestuffs, wetting agents, detergents, flotation agents for the separation of metals or metal compounds from their ores and the like.

The properties of the herein disclosed novel compounds are greatly influenced by the nature of the alkyl groups which are substituted in the cyclohexyl nucleus and also by the position of the said alkyl groups relative to the hydroxyl-containing side chain. As a result, certain members of the series have unique and unobvious properties which make them particularly applicable to uses to which other members of the series are not so well suited. This relationship between structure and properties is more fully described hereinbelow.

A particularly valuable group of the novel compounds of the invention are the 1-cyclohexyl-1,3-butanediols wherein there is at least one alkyl substituent group attached to the cyclohexyl nucleus. The number of the alkyl groups substituted upon the cyclohexyl nucleus and their position in the six-membered ring may be varied as desired or necessary to impart to the glycol the desired physical and chemical properties. The more useful derivatives may, however, be classified into structural groups according to the number and position of the said alkyl substituents. Thus, it has been found that those compounds which contain alkyl substituents, preferably methyl groups, in the 3,5-position relative to the hydroxyl-containing side chain represent one class of particularly useful derivatives which are of particular value as insect repellents, e. g., as mosquito repellents, suitable for use in spray form. Similarly, those glycols which are substituted with an alkyl group in the 1-position in the cyclohexyl nucleus relative to the hydroxyl-containing side chain represent a second class of glycols having distinctive properties, making them suitable for uses to which the members of the aforesaid class may not be applicable. Members of this class having an alkyl group in the 1-position may also have alkyl substituents on the other carbon atoms of the cyclohexyl ring, as, for example, in the 3,5-position. Still another group having unique and distinctive properties comprises those compounds wherein two hydrogen atoms of the cyclohexyl nucleus, particularly the hydrogen atoms in the 2- and 5-positions, are linked to an alkylene radical such as a methylene radical, an alkyl-substituted methylene radical, an ethylene radical or an alkyl-substituted ethylene radical, thus giving rise to a bridged ring structure such as an endomethylene cyclohexyl, endoethylenecyclohexyl or endoxocyclohexyl structure. The manner in which these classes of compounds differ from each other in properties and their suitability for use for particular applications are more fully disclosed hereinbelow.

The glycols of the invention may be conveniently prepared in good yields from readily available starting materials, i. e., from conjugated dienes, alpha, beta-unsaturated carbonylic compounds and commercially available ketones by a novel process which comprises condensing the said conjugated diene with the said alpha, beta-unsaturated carboxylic compound to form at least one unsaturated cyclic carbonylic compound. The latter may then be reacted with a ketone of a suitable structure to form an alkyl cyclohexenyl-substituted ketol which may be reduced to form the desired glycol. The first step in this series of reactions may be effected by use of the general procedure employed in the well-known Diels-Alder synthesis for the production of cyclic compounds by the addition of mono-olefinic compounds to conjugated dienes. The reaction may be carried out, for example, by forming a mixture comprising a conjugated diene and an olefinic compound, heating the said mixture to a reaction temperature and maintaining the mixture at the said reaction temperature at atmospheric pressure or at superatmospheric pressures for a period of time sufficient to effect the desired condensation. The cyclic product may then be isolated from the reaction mixture by any suitable method as, for example, by fractional distillation. A preferred method for effecting the said condensation reaction is represented by that method which may be employed to advantage in the synthesis of a dimethyl tetrahydrobenzaldehyde product from acrolein and methylpentadiene. This reaction may be represented by the equation:

$$CH_2=CH-CH=CH-CH_3 + CH_2=CH-CHO \longrightarrow$$

Methylpentadienes      Acrolein

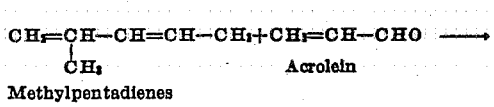

3,5-dimethyl-1,2,5,6-tetrahydrobenzaldehyde and/or

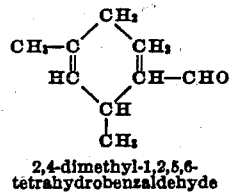

2,4-dimethyl-1,2,5,6-tetrahydrobenzaldehyde

In this embodiment a mixture of approximately equimolecular quantities of acrolein and methylpentadiene is heated, preferably in the presence of an oxidation inhibitor such as hydroquinone or tert-butyl catechol at a temperature of between about 75° C. and about 125° C., the temperature employed being dependent upon whether the operation is carried out at atmospheric or superatmospheric pressure. If superatmospheric pressures are employed, the reaction may be effected at pressures of up to about 1500 p. s. i., preferably at pressures of about 1000 p. s. i. At the conclusion of the reaction period the reaction mixture may be fractionally distilled in order to separate the dimethyltetrahydrobenzaldehyde product.

The second step of the procedure comprises condensing the unsaturated cyclic carbonylic compound produced as described with a saturated ketone containing at least two hydrogen atoms on a carbon atom adjacent to the carbon atom of the carbonylic group. This reaction may, in general, be effected by reacting the said unsaturated cyclic carbonyl compound with the said ketone in the presence of a condensing agent, preferably an alkaline condensing agent such as sodium hydroxide. Although the reaction conditions employed may be varied to suit the properties of the particular starting materials used, the reaction may usually be carried out at a temperature of less than 100° C., preferably between about 25° C. and about 35 C. A preferred method for carrying out the condensation is represented by that which may be used to effect the reaction of the hereinabove described unsaturated cyclic aldehyde, i. e. dimethyltetrahydrobenzaldehyde with acetone in accordance with the general equation:

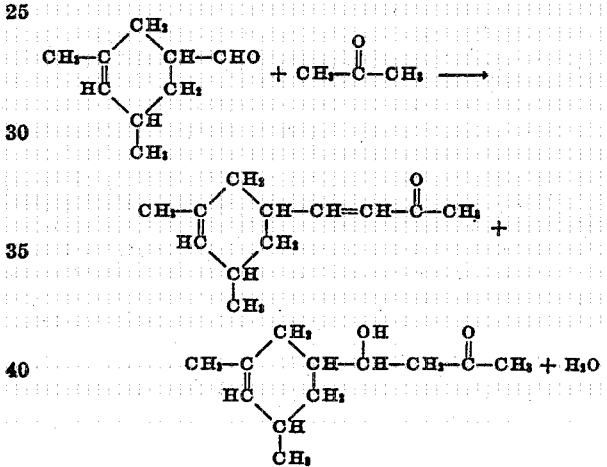

This condensation may be readily carried out by adding to a reaction mixture, comprising the said aldehyde and a molar excess of acetone, a condensing agent, e. g. a 10% aqueous solution of sodium hydroxide, at such a rate that the temperature of the reaction does not exceed above about 50° C. and preferably remains about 30° C. After the addition is complete, the reaction mixture may be stirred or otherwise agitated until no further reaction occurs. The reaction mixture may then be acidified with a suitable acid such as hydrochloric acid, and the mixture of alkyl cyclohexenyl-substituted ketol and alkyl cyclohexenyl-substituted alpha, beta1-unsaturated ketone separated, and purified if desired by fractional distillation.

The final step in the procedure, i. e. the conversion of the said alkyl cyclohexenyl-substituted ketol to the desired 1,3-glycol, may be readily carried out in a single step by reducing the said ketol with hydrogen. The reduction step, which may preferably be carried out catalytically, using a suitable hydrogenation catalyst such as an active nickel catalyst, results in the hydrogenation of the double bond in the cyclohexene ring, as well as the concurrent hydrogenation of the carbonyl group to a carbinol group, thus leading to the formation of an alkyl-substituted 1-cyclohexyl-1,3-glycol, i. e. a glycol wherein the two hydroxyl groups are separated by a single carbon atom and wherein one of the carbinol carbon atoms is directly attached to a cyclohexyl radical. The reaction occurring may be illustrated by the following equation:

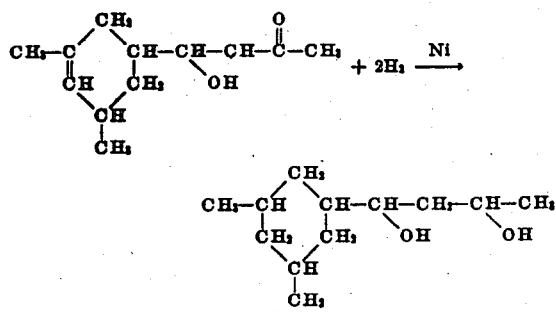

This reduction reaction may be preferably carried out at elevated pressures, e. g. pressures of up to about 3000 p. s. i., preferably about 1000 p. s. i. to 1400 p. s. i., at temperatures of up to about 300° C., preferably about 175° C. The usual hydrogenation catalysts may be employed, although an active nickel catalyst, preferably an active nickel catalyst in the form commonly designated as nickel catalyst, is especially active in promoting the desired reaction. It is usually preferred to carry out the reduction step using a solution of the unsaturated carbonylic compound in a suitable solvent such as an alcoholic solvent, e. g. isopropyl alcohol. Water may also be present if desired. The hydrogenation step may thus be conveniently effected in a solution comprising wet isopropyl alcohol and the mixture of ketol and unsaturated ketone obtained by the reaction of the tetrahydrobenzaldehyde with a ketone. A preferred procedure for effecting the reaction comprises contacting a solution containing the above described ketol and unsaturated ketone prepared by the condensation of dimethyltetrahydrobenzaldehyde with acetone, with an active nickel catalyst, e. g. Rufert nickel catalyst, at a temperature of about 175° C. and a pressure of between about 1000 p. s. i. and about 1400 p. s. i. The reaction mixture is preferably shaken, stirred or otherwise agitated during the hydrogenation process. When the reaction is complete the 1-(3,5-dimethylcyclohexyl)-1,3-butanediol product may be separated from the reaction mixture by filtering the catalyst therefrom, and fractionally distilling the catalyst-free reaction mixture.

The invention is not limited, however, to the preparation of 1-(3,5-dimethylcyclohexyl)-1,3-butanediol from methylpentadiene, acrolein and acetone. It may be extended through the use of structurally related starting materials to the preparation of a variety of novel and useful cyclohexyl-substituted glycols. Representative conjugated dienes which may be used in place of methyl-pentadiene include, for example, butadiene, the 2-alkyl butadienes, particularly isoprene, the alkyl-substituted 1,3-pentadienes, 1,3-cyclopentadiene and its alkyl derivatives, particularly its methyl derivatives, and 1,3-cyclohexadiene together with its alkyl derivatives, particularly its methyl derivatives. Suitable alpha, beta-unsaturated carbonylic compounds comprise, for example, acrolein, the alkyl-substituted acroleins, particularly methacrolein, 2-methyl-3-ethyl acrolein and 2-ethyl-3-propyl acrolein, and the alpha,beta-unsaturated ketones such as methyl vinyl ketone and methyl isopropenyl ketone. A variety of saturated ketones may also be used for the second step in the synthesis. Ketones of suitable structure include those which have at least two hydrogen atoms on one of the carbon atoms which is adjacent to the carbon atom of the carbonyl group, i. e. ketones which have two hydrogen atoms on an alpha carbon atom. Ketones having this structure include acetone, methyl ethyl ketone, diethyl ketone, methyl-n-propyl ketone, methyl isopropyl ketone, methyl butyl ketone, mesityl oxide, cyclohexanone, cyclopentanone, isophorone, dihydroisophorone and the like.

As stated hereinabove the properties of the cyclohexyl-substituted glycols of the invention and the uses to which they may be put are largely dependent upon the number and nature of the alkyl substituents present within the molecule and upon their position relative to the hydroxyl groups. The alkyl cyclohexyl glycols have, for example, markedly different properties from the cyclohexyl glycols which do not contain alkyl substituents within the cyclohexyl nucleus. The alkyl cyclohexyl glycols, particularly those in which the alkyl substitutents are in the 3,5-position relative to the hydroxyl-containing side chain, as in the case of 1-(3,5-dimethylcyclohexyl)-1,3-butanediol, have substantially different physical properties from the unsubstituted glycols. Thus, the said 1-(3,5-dimethylcyclohexyl)-1,3-butanediol is a liquid of relatively high boiling point which is particularly suitable for use in heat transfer media because of its high boiling point and its relatively low volatility. It is also especially useful in the manufacture of glyptal resins, since the presence of the alkyl substituents increases the hydrocarbon solubility of the glyptal resin prepared therefrom and therefore makes the said glyptal resin particularly suitable for use in compositions such as coating compositions of which a hydrocarbon solvent is a constituent. The alkyl-substituted glycols, particularly those wherein the alkyl groups are in the 3,5-position, are also particularly well suited for use as solvents for or constituents of lacquer or synthetic resin varnishes. By varying the size of the alkyl group a series of such solvents may be prepared the members of which differ in boiling point and volatility and may therefore be adapted for use in different types of varnishes and lacquers. The glycols have the further advantage over the unsubstituted glycols in that they do not attack or dissolve rubber or rubber compositions and may be incorporated in mixtures such as radiator coolant media in aircraft engines which come in contact with rubber or rubber compositions.

A second class of the herein described novel cyclohexyl-substituted glycols comprise those having an alkyl group, e. g. a methyl group, substituted upon the same carbon atom of the cyclohexyl nucleus which bears the glycol side chain. 1-(1-methylcyclohexyl)-1,3-butanediol and 1-(1,3,5-trimethylcyclohexyl)-1,3-butanediol are representative of this class. As is apparent, these compounds contain a quaternary carbon atom, i. e. a carbon atom which is directly attached to four other carbon atoms. This structural grouping likewise imparts unique properties to the glycols characterized thereby. These compounds are, for example, particularly active and useful insect repellents and may be used as insert repellents either alone or in combination with active insecticidal substances such as pyrethrum, rotenone, dimethylphthalate, etc. These compounds are particularly valuable as insecticides since they are, surprisingly, relatively insoluble in water but are readily soluble in hydrocarbon solvents such as kerosene and are therefore readily adaptable for use in insecticidal spray compositions. Compounds of this type are also particularly useful as synthetic intermediates in the preparation of plasticizers, perfumes, pharmaceuticals, etc., since they likewise impart unique properties attributable to the presence of a quaternary carbon atom to the said derivatives.

The endoalkylenecyclohexyl-substituted glycols comprise a further distinctive class in that the presence of the endoalkylene group, e. g. the endomethylene or endoethylene group, imparts still different properties to the compounds containing the same and makes them compatible with a variety of structurally related substances. Examples of this type of compound are 2,5-endomethylenecyclohexyl-,3-butanediol and 2,5-endoethylenecyclohexyl-1,3-butanediol. These compounds are akin in structure to the terpenes, particularly camphor, and are compatible therewith. Hence, they are useful in terpene-containing compounds as terpene substitutes for a wide variety of uses such as in compositions containing nitrocellulose, in pharmaceutical products and in medicinal preparations.

The invention includes certain novel derivatives of the herein described novel cyclohexyl-substituted glycols. It includes particularly the esters and ethers of the said compounds. These compounds have many uses but are particularly useful as solvents and as plasticizers for a variety of organic materials. The esters may be prepared by any of the methods customarily employed for the synthesis of esters from an organic hydroxy compound and an esterifying agent. They may be prepared, for example, by reacting one of the glycols of the invention with a saturated or unsaturated, cyclic or acyclic, mono- or polycarboxylic acid in the presence of an acidic esterification catalyst. Suitable acid catalysts include sulfuric acid, hydrochloric acid, phosphoric acid, and, preferably, para-toluene sulfonic acid. The relative amounts of glycol and organic acid which may be used in the synthesis is dependent in part upon whether it is desired to esterify one or both of the hydroxyl groups of the glycol molecule. When it is desired to prepare a mono-ester, an amount of organic acid may be used which is approximately equivalent to or slightly in excess of the amount which is equivalent to the glycol used. However, if it is desired to prepare the di-ester, at least two molecular equivalents of organic acid should be used for each equivalent of glycol. Thus, in a preferred method for preparing the diacetate of 1-(3,5-dimethylcyclohexyl)-1,3-butanediol a quantity of the said butanediol may be heated together with a sufficient amount of acetic acid to supply at least two mols of acetic acid for each mol of glycol. A small amount of acidic material, preferably para-toluene sulfonic acid, may be added to the reaction mixture. The said mixture may then be heated to a temperature of between about 90° C. and 116° C. During this heating period it may be preferable to remove the water which is a product of the esterification reaction substantially as it is formed. This may be accomplished by operating at reflux temperature in a distillation apparatus feed with a separatory stillhead, using benzene or other material forming a constant boiling mixture with water as an entraining agent if desired. At the conclusion of the reaction the acid catalyst may be neutralized and the reaction mixture distilled to separate the ester product therefrom. This procedure may be adapted to the preparation of esters from any of the cyclohexyl-substituted glycols of the invention, using such organic acids as acetic acid, propionic acid, butyric acid, valeric acid, caproic acid, oenanthic acid, caprylic acid, pelargonic acid, lauric acid, myristic acid, palmitic acid, margaric acid, stearic acid, arachidic acid, chloroacetic acid, dichloroacetic acid, bromoacetic acid, alpha bromopropionic acid, beta bromopropionic acid, the chlorobutyric acids, alpha bromostearic acid, lactic acid, acrylic acid, methacrylic acid, crotonic acid, isocrotonic acid, 2-methyl-3-ethyl acrylic acid, 2-ethyl-3-propyl acrylic acid, the pentenoic acids, the hexenoic acids, oxalic acid, succinic acid, methyl succinic acid, tartaric acid, glutaric acid, adipic acid, pimelic acid, benzoic acid, the halogen-substituted benzoic acids, the alkyl-substituted benzoic acids such as toluic acid, phthalic acid, the alkyl-substituted phthalic acids and the like.

Alternatively the novel glycol esters of the invention may be prepared by reacting the said glycols with esterifying reagents other than the organic carboxylic acids. Other esterifying reagents which may be used include, for example, the acid halides and the acid anhydrides. Thus, the acid halides or acid anhydrides corresponding to the organic carboxylic acids listed hereinabove may be employed for the synthesis of glycol esters, using suitable modifications of the experimental procedures customarily employed for the preparation of esters from alcohols and acid halides or acid anhydrides.

The ethers of the glycols of the present invention may likewise be prepared by methods known to the art for the preparation of the ether derivatives of alcohols. They may be prepared, for example, by reacting the glycol with elementary sodium, thereby forming a sodium alkoxide which may be reacted with an alkyl halide or, preferably with a sulfuric acid ester such as dimethyl sulfate to form the desired ether. Or if desired, the ether may be prepared by reacting the glycol with an alcohol in the presence of sulfuric acid, using the procedure substantially as employed in the synthesis of diethyl ether from ethyl alcohol. Either the mono-ethers or the di-ethers may be prepared by these methods, depending upon the relative amounts of starting materials which are employed. In this manner may be synthesized the mono- and di-ethers of the 1-alkylcyclohexyl-1,3-butanediols of the invention, using, for example, the following alcohols: methyl alcohol, ethyl alcohol, propyl alcohol, the butyl alcohols, the amyl alcohols, the hexyl alcohols, n-heptyl alcohol, 2,4-dimethyl pentanol-1, octanol-1, 2-ethyl hexanol-1, lauryl alcohol, allyl alcohol, crotyl alcohol, methallyl alcohol, 2-methyl-3-ethyl allyl alcohol, 2-ethyl-3-propyl allyl alcohol, monomethyl ether of ethylene glycol, the chlorine-substituted butyl alcohols, cyclopentanol, methylcyclopentanol, cyclohexanol, methylcyclohexanol, benzyl alcohol, ethylene glycol, glycerol, propylene glycol, butanediol-1,3, tetramethylene glycol and the like.

The process of the invention may be illustrated by the following examples.

*Example I*

A mixture comprising approximately equimolecular proportions of acrolein and of 2-methyl-pentadiene was heated at a temperature which was substantially the reflux temperature of the mixture, at atmospheric pressure for several hours. The reaction mixture was then fractionally distilled, thereby separating a 75% conversion of dimethyltetrahydrobenzaldehyde.

To a stirred solution of about 552 grams of dimethyltetrahydrobenzaldehyde in about 696 grams of acetone was added approximately 115 cc. of 10% aqueous sodium hydroxide at such a rate that the temperature did not exceed about 30° C. After the addition was complete the stirring was continued for 3 hours. The reaction mixture was then faintly acid with concentrated hydrochloric acid and the upper layer separated. After extracting the water layer with benzene, the benzene extract and upper layer were combined and fractionated. The product obtained was a mixture boiling between 87° C. to 96° C. at 1 mm. and 101° C. to 110° C. at 1 mm. There was recovered about 482 grams of reaction product consisting of a ratio of methyl beta-(dimethylcyclohexenyl)vinyl ketone to 4-(dimethylcyclohexenyl)butan-2-one-4-ol of about 1:10.

A mixture of the above unsaturated ketone and the ketol was hydrogenated in an isopropyl alcohol solution using Rufert nickel catalyst at a temperature of about 150° C. and a pressure of about 1000 pounds per square inch. On fractionation there were found two products, a dimethylcyclohexyl butanol boiling at 106° C. to 108° C. at 5 mm., and a dimethylcyclohexyl butanediol boiling at 127° C. to 128° C. at 1.5 mm.

The 1-(3,5-dimethylcyclohexyl)-1,3-butanediol obtained was miscible with hydrocarbon solvents such as odorless kerosene but was substantially insoluble in water. It was a heavy viscous liquid which crystallized very slowly to a white solid having a melting point of 93° C. to 96° C. The specific gravity (sp. gr. 20/4) of the uncrystallized liquid was 1.00 while the refractive index (R. I. 20/D) was 1.4478.

*Example II*

Following the procedure described in Example I, 1-cyclohexyl-2-methyl-1,3-pentanediol may be prepared from butadiene, acrolein and methyl propyl ketone.

*Exemple III*

1 - (1,3,5 - trimethylcyclohexyl)-1,3-butanediol was prepared in the manner described in Example I by condensing methylpentadiene and methacrolein to form trimethyltetrahydrobenzaldehyde; condensing about 608 grams of trimethyltetrahydrobenzaldehyde with about 696 grams of acetone to form the trimethylcyclohexenyl-substituted ketol boiling at 105° C. to 115° C. at 0.5 mm.; and reacting the ketol with hydrogen in the presence of a Raney nickel. The glycol product was a colorless liquid boiling at 103° C. to 106° C. at 0.5 mm.

*Example IV*

1-(1,5-dimethylcyclohexyl)-2,4,4-trimethyl-6-hydroxycyclohexylcarbinol is prepared according to the procedure of Example I, using as starting materials pentadiene, methacrolein and 3,3,5-trimethylcyclohexanone.

*Example V*

1-(1-methyl-2,5-endomethylenecyclohexyl)-1,3-butanediol was prepared by substantially the same procedure described in Example I. In this case, however, cyclopentadiene was reacted with methacrolein, thereby forming methyl-2,5-endomethylenetetrahydrobenzaldehyde which was then condensed with acetone to form the ketol of corresponding structure. The ketol was then reduced with hydrogen in the presence of a nickel hydrogenation catalyst to give the glycol.

*Example VI*

In a similar manner 1-(1-methyl-6-ethyl-2,5-endomethylenecyclohexyl)-1,3-pentanediol may be prepared from cyclopentadiene, 2-methyl-3-ethylacrolein and methyl ethyl ketone.

*Example VII*

The diacetate of 1-(3,5-dimethylcyclohexyl)-1,3-butanediol may be prepared by reacting 1-(3,5-dimethylcyclohexyl)-1,3-butanediol with acetic acid in an amount sufficient to furnish at least two mols of acetic acid for each mol of glycol and using a small amount of para-toluene sulfonic acid as an esterification catalyst. At the conclusion of the reaction period the acid may be neutralized and the ester product separated in a pure state by distillation of the neutralized reaction mixture.

*Example VIII*

The dimethyl ether of 1-(3,5-dimethylcyclohexyl)-1,3-butanediol may be prepared by reacting the glycol with metallic sodium to form the sodium derivative. This is then reacted with dimethyl sulfate and the reaction mixture distilled to separate the desired ether.

*Example IX*

1-cyclohexyl-1,3-butanediol was prepared by hydrogenating the 1-cyclohexenyl-butan-1-ol-3-one prepared by reacting acetone with the tetrahydrobenzaldehyde formed by the condensation of butadiene with acrolein. The 1-cyclohexyl-1,3-butanediol was a viscous water-white liquid having a boiling point of 100° C. to 103° C. at 0.5 mm.

We claim as our invention:
1. 1-(3,5-dimethylcyclohexyl)-1,3-butanediol.
2. The 3,5-dialkylcyclohexyl glycols wherein the dialkylcyclohexyl group is directly attached to a carbon atom bearing one of the hydroxyl groups and wherein the two hydroxyl groups are in the 1,3-position relative to each other on carbon atoms in a side chain of at least four carbon atoms.
3. The diacetate of 1-(3,5-dimethylcyclohexyl)-1,3-butanediol.
4. The dimethyl ether of 1-(3,5-dimethylcyclohexyl)-1,3-butanediol.
5. A compound from the group consisting of the 3,5-dialkylcyclohexyl glycols wherein the dialkylcyclohexyl group is directly attached to a carbon atom bearing one of the hydroxyl groups and wherein the two hydroxyl groups are in the 1,3-position relative to each other on carbon atoms in a side chain of at least four carbon atoms, their carboxylic acid esters, and their ethers.
6. A fatty acid ester of the 3,5-dialkylcyclohexyl glycols wherein the dialkylcyclohexyl group is directly attached to a carbon atom bearing one of the hydroxyl groups and wherein the two hydroxyl groups are in the 1,3-position relative to each other on carbon atoms in a side chain of at least four carbon atoms.

EDWARD C. SHOKAL.
RUPERT C. MORRIS.

REFERENCES CITED

The following references are of record in the file of this patent:

UNITED STATES PATENTS

| Number | Name | Date |
|---|---|---|
| 1,891,043 | Diels | Dec. 13, 1932 |

(Other references on following page)

UNITED STATES PATENTS

| ıber | Name | Date |
|---|---|---|
| 31,846 | Jaeger | Oct. 24, 1933 |
| 79,809 | Bockmuller | Nov. 14, 1939 |
| 22,357 | Wolfe | Nov. 19, 1940 |
| 46,032 | Bent | June 17, 1941 |
| 39,818 | Rummelsburg | Jan. 25, 1944 |
| 73,568 | Joy | Apr. 10, 1945 |
| 10,007 | Bludworth et al. | Oct. 29, 1946 |

FOREIGN PATENTS

| Number | Country | Date |
|---|---|---|
| 476,189 | Great Britain | Dec. 3, 1937 |

OTHER REFERENCES

Sprague, "Journal American Chemical Society," vol. 56, pages 2269–75 (1934).

Shorygin et al., Chem. Abs., vol. 31, 2184 (1937); also in Jour. Gen. Chem., U. S. S. R., vol. 6, 1569–77 (1936).